Nov. 22, 1938.  E. E. LUNDBERG  2,137,653
FASTENER DEVICE
Filed Aug. 27, 1936  2 Sheets-Sheet 1
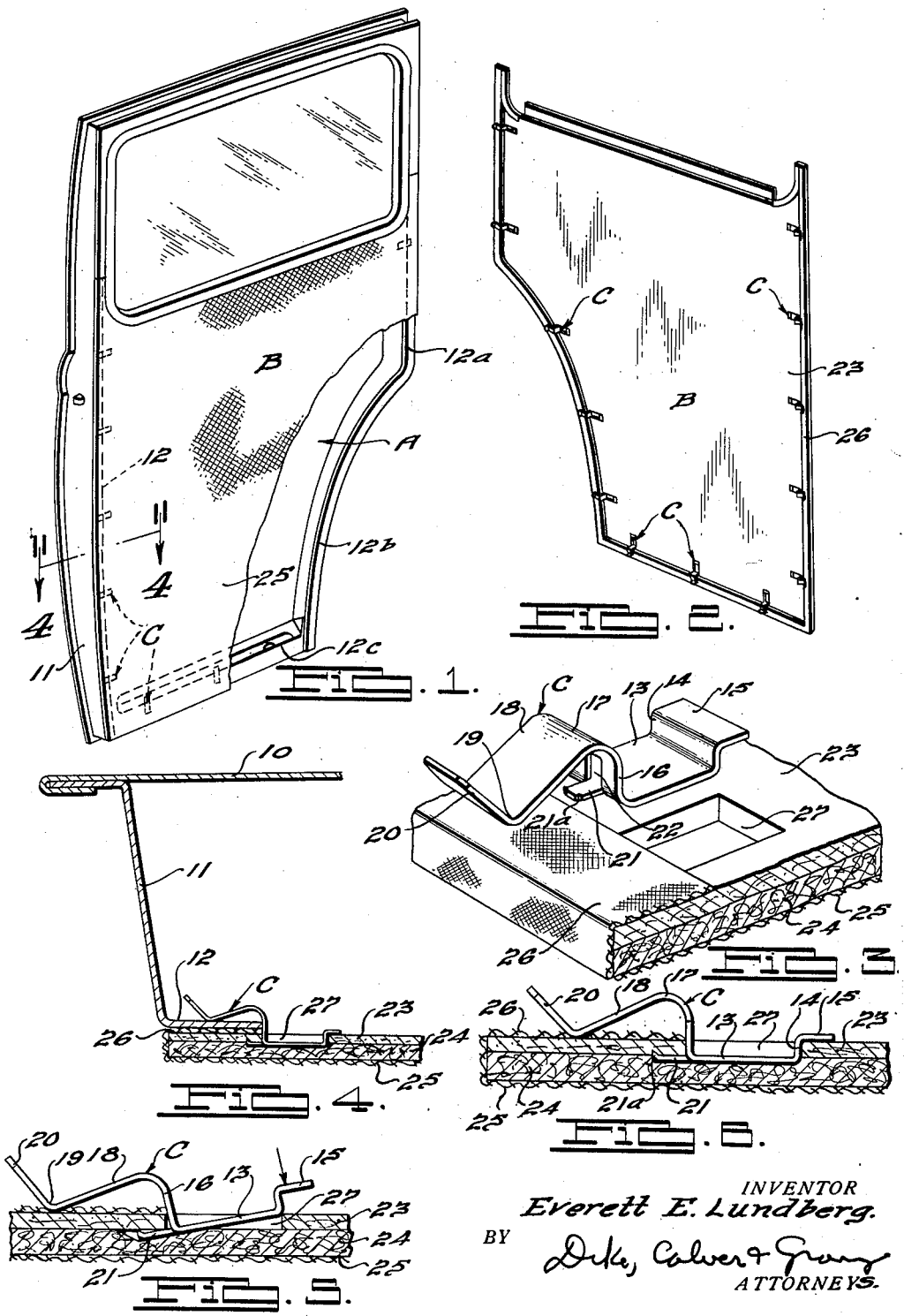
INVENTOR
Everett E. Lundberg.
BY
ATTORNEYS.

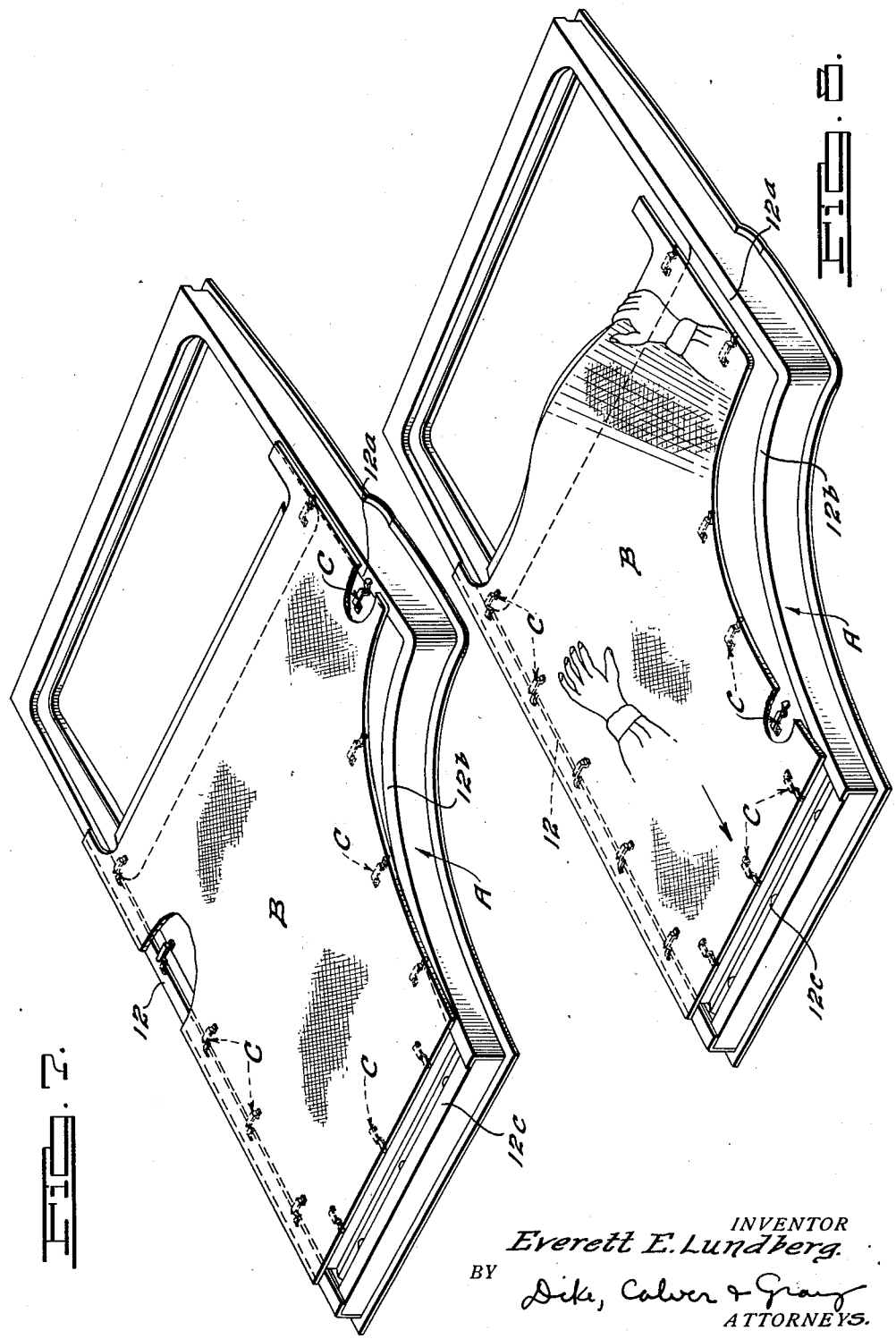

Patented Nov. 22, 1938

2,137,653

UNITED STATES PATENT OFFICE 2,137,653

FASTENER DEVICE

Everett E. Lundberg, Detroit, Mich., assignor to Briggs Manufacturing Company, Detroit, Mich., a corporation of Michigan Application August 27, 1936, Serial No. 98,231

4 Claims. (Cl. 24—259)

This invention relates to fastener devices for trim panels or the like and particularly to fastener devices adapted for use in the interior trim finish of automobiles or other vehicle bodies.

An object of the invention is to provide an improved fastener means for removably attaching with ease and facility a trim panel or the like to the door or other portion of the framing of a vehicle body.

A further object of the invention is to provide a new and improved fastener device for detachably securing an interior trim panel or the like to the body so that by virtue of the invention there is provided a fastener device of relatively simple construction which may be manufactured at low cost and assembled on the panel with a minimum of time and labor and enabling the provision of a trim panel which may be easily applied to the door or other framing of the vehicle body.

Another object of the invention is to provide an improved fastener device for a trim panel which may be cheaply and easily manufactured from a single piece or strip of metal and which may be assembled on the trim panel after applying the trim material thereto without the necessity of using separate retainer or clip devices for holding the fastener element in place.

Other objects of this invention will appear in the following description and appended claims, reference being had to the accompanying drawings forming a part of this specification wherein like reference characters designate corresponding parts in the several views.

Fig. 1 is a perspective view, partly broken away, of an automobile door having mounted thereon a trim panel embodying the present invention.

Fig. 2 is a perspective view looking at the rear face of a trim panel constructed in accordance with the invention.

Fig. 3 is a perspective view of the fastener device preparatory to assembly on the trim panel backing sheet, a portion of the latter being shown in the view.

Fig. 4 is an enlarged section taken through line 4—4 of Fig. 1 in the direction of the arrows.

Figs. 5 and 6 are fragmentary sections taken through the trim panel and illustrating the assembly of the fastener device on the backing sheet.

Fig. 7 is a perspective view of the inside of the vehicle door illustrating a step in the assembly of the panel on the door.

Fig. 8 is a similar view illustrating a succeeding step in the assembly of the panel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings there is illustrated, by way of example, a door A of an automobile body having mounted thereon, through the medium of fasteners C, a trim panel B, the panel and fasteners being constructed in accordance with the present invention.

It will be understood that trim panels may be of different shapes and sizes and may be mounted on any of the doors of an automobile or other vehicle body or at other locations on the inside of the body.

The trim panel B in the present embodiment is shown as installed on a door A which comprises an outer metal panel 10 secured in the usual manner to the framing 11. As illustrated in Fig. 4 the framing at one side of the door is formed at its rear edge with an inwardly turned flange 12. It will be understood that the framing at the opposite side of the door and at the bottom thereof is also constructed to provide similar flanging. At the side of the door opposite the flange 12 there is an inwardly turned flange 12a, a flange 12b along a curved portion of the door which extends over the wheel housing and a flange 12c along the bottom of the door.

Referring particularly to Fig. 3, the fastener C in the present form thereof comprises a one-piece device formed up from a single metal strip or blank. The fastener comprises preferably a flat base or body 13 provided at its rear end with an upstanding abutment 14 which forms the heel of the device. From the upper edge of the abutment 14 the metal of the strip is turned rearwardly to provide a flange or lip 15. At its forward end the base 13 is bent up to provide an abutment 16 and thence the metal is reversely bent to provide a spring bow 17 in the form substantially of a goose-neck bend. Thence the metal of the strip is extended forwardly and downwardly to provide a gripping member 18 terminating in a curved gripping portion 19. The forward end of the gripping member is bent upwardly to provide a flaring lead end 20. A forwardly projecting tongue or lug 21 is struck out from the metal of the wall or abutment 16, as shown at 22, and this lug extends preferably substantially in the plane of the base 13.

The trim fastener C is applied to and assembled with a trim panel which in the present instance comprises a foundation or backing sheet 23 of fiberboard. The front face of the backing sheet is covered by means of a padding material 24 of compressed jute or other fibrous substance and this layer is in turn covered with a trim fabric 25 which is folded around the edges of the foundation sheet 23, as shown at 26, and cemented at the rear face of the foundation sheet along the edges thereof. At suitable points along the side and bottom edges of the trim panel and inwardly of the cemented edges 26 of the fabric material the foundation sheet 23 is provided with holes or apertures 27 extending through the backing sheet, these apertures in the present instance being substantially rectangular in shape and having substantially the area and shape of the body or shank 13 of the fastener so that when the fastener is installed that portion thereof extending from the abutment 14 to the abutment 16 will preferably fill and close the aperture 27.

The fastener C may be readily assembled on the trim panel by first inserting the tongue or extension 21, which lies forwardly of the abutment 16, into the aperture 27 so as to extend beneath and underlap the forward edge of the aperture as shown in Fig. 5. Since the front corners 21a of the tongue 21 are slightly bent up they permit this tongue to be inserted between the foundation sheet and padding 24 without snagging and so as to cause these corners preferably to embed slightly or dig into the underface of the fiberboard when the fastener is finally installed as shown in Fig. 6. After inserting the fastener in the manner shown in Fig. 5 the rear end thereof is forced downwardly in the direction of the arrow so as to force the heel 14 into the hole 27. This downward movement of the heel in a slightly arcuate path forces it tightly against the rear edge of the aperture 27 and when the fastener is in place as shown in Fig. 6 the abutments 14 and 16 will tightly engage the rear and front edges of the aperture and hold the fastener in position within the aperture by the frictional or gripping engagement of the abutments with the edges of the foundation sheet. Due, therefore, to the tight fit of the abutments 14 and 16 within the aperture the fastener will be frictionally held in place against dislodgment before the trim panel is installed on the body.

When the fasteners are thus installed, as shown in Fig. 6, it will be seen that the tongue portion 21 underlies the forward edge of the aperture 27 and the flange 15 overlies the rear edge of the aperture. The shank or base 13 preferably fits the bottom of the aperture, entirely fills it and lies nearly or approximately flush with the underface of the foundation sheet.

Preparatory to the installation of the trim panel on the door structure or other part of the body, the trim panel, as shown in Fig. 2, is preferably provided with a suitable number of fasteners C along the sides and bottom edges thereof. It will be understood that the fasteners are, in practice, installed after the trim fabric has been applied to the foundation sheet.

As illustrated in Fig. 7, the trim panel may be readily installed by inserting the flared or lead ends 20 of the gripping members behind the flange 12 along one vertical side of the door and then forcing the panel laterally, or to the left in Fig. 7, so as to force the gripping portions 19 of the fasteners over the back face of the flange. In this operation the gripping portions are pressed or sprung out so as to grip the flange 12 and clamp the back face of the foundation sheet firmly against the inner face of the flange 12, as illustrated in Fig. 4. The trim panel may then be bowed outwardly a sufficient extent to permit the fasteners C at the opposite vertical edge of the panel to engage behind the edge of the flange portion 12a, as illustrated in Fig. 8. By then flattening out the panel these fasteners will be forced into gripping engagement with the flange 12a in the same manner as is shown in Fig. 4. The panel may then be slid downwardly so as to cause the gripping portions of the remaining fastener devices to be forced beneath the flanges 12b and 12c and to grip the same in the manner illustrated in Fig. 4. With the panel thus installed on the door, as illustrated in Fig. 1, it will be seen that the trim panel may not be pried loose from the door by inserting a tool beneath the edge of the panel, this for the reason that the forces against the gripping portions 19 tend to tilt the fasteners within the apertures which is resisted by the flanges 15 and the tongues 21. The panel may only be removed by substantially reversing the operation of assembly described above. The fastener however may be readily removed from the aperture 27 by grasping the heel portion thereof and exerting nearly a straight outward and rearward pull thereon.

I claim:

1. A fastener device for a trim panel, comprising a substantially flat base, a pair of longitudinally spaced upstanding abutments extending from the base, a tongue formed from the metal of one of said abutments and extending substantially in the plane of the base, a flange extending from the other of said abutments and offset from said base, and a spring gripping member extending from the first named abutment, said base forming substantially an inflexible connection between said abutments.

2. A fastener device for a trim panel, comprising a substantially flat base, a pair of longitudinally spaced upstanding abutments extending from the base, a tongue formed from the metal of one of said abutments and extending in one direction substantially in the plane of the base, a flange extending in the opposite direction from the other of said abutments and offset from said base, and a spring gripping member extending from the first named abutment, said base forming substantially an inflexible connection between said abutments.

3. A fastener device for a trim panel, comprising a substantially flat base, a pair of longitudinally spaced upstanding abutments extending from the base and forming a part thereof, a tongue formed from the metal of one of said abutments and extending in the plane of the base a flange extending from the other of said abutments and offset from said base, and a spring gripping member extending from a part of the base between said tongue and said flange, said base forming substantially a rigid connection between said abutments.

4. A fastener device for a trim panel having an aperture formed therein, comprising a relatively flat base insertable in said aperture and having a pair of longitudinally spaced upstanding abutments extending from the base and forming a part thereof, a tongue formed from the metal o one of said abutments and extending substantially in the plane of the base adapted to overlap one edge of the panel aperture at one face of the panel, a flange extending from the other of said abutments and offset from said base to overlap the opposite edge of the panel aperture at the other face of the panel, and a spring gripping member extended from a part of the base, said base forming substantially a rigid connection between said abutments.

EVERETT E. LUNDBERG.